(12) United States Patent
Choi et al.

(10) Patent No.: US 9,885,119 B2
(45) Date of Patent: Feb. 6, 2018

(54) ELECTROCHEMICAL AND PHOTOELECTROCHEMICAL REDUCTION OF FURFURALS

(71) Applicant: Wisconsin Alumni Research Foundation, Madison, WI (US)

(72) Inventors: Kyoung-Shin Choi, Fitchburg, WI (US); John James Roylance, Madison, WI (US); Stephen R. Kubota, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 259 days.

(21) Appl. No.: 14/620,628

(22) Filed: Feb. 12, 2015

(65) Prior Publication Data

US 2016/0237576 A1   Aug. 18, 2016

(51) Int. Cl.
C25B 3/00 (2006.01)
C25B 3/04 (2006.01)
C25B 11/04 (2006.01)
C25B 1/00 (2006.01)

(52) U.S. Cl.
CPC ............ C25B 3/04 (2013.01); C25B 1/003 (2013.01); C25B 11/04 (2013.01); Y02P 20/135 (2015.11)

(58) Field of Classification Search
CPC ..................................................... C25B 3/04
USPC ............................................... 205/450, 453
See application file for complete search history.

(56) References Cited

U.S. PATENT DOCUMENTS

| 7,052,587 | B2 | 5/2006 | Gibson et al. |
| 2012/0271060 | A1 | 10/2012 | Munoz de Diego et al. |
| 2014/0110268 | A1* | 4/2014 | Jackson ............... C25B 3/04 205/351 |
| 2014/0235838 | A1 | 8/2014 | Stahl et al. |
| 2015/0060296 | A1* | 3/2015 | Elangovan ............ C25B 3/04 205/334 |
| 2015/0361566 | A1 | 12/2015 | Choi et al. |
| 2016/0201204 | A1 | 7/2016 | Choi et al. |

OTHER PUBLICATIONS

Green et al., "The Electrocatalytic Hydrogenation of Furanic Compounds in a Continuous Electrocatalytic Membrane Reactor," Green Chem. (no month, 2013), vol. 15, pp. 1869-1879.*
Chen et al., "Electro-Generation of Furfural Alcohol in Ni—P-mCMC/mCS Bipolar Membrane Equipped Electrolysis Cell," Advanced Materials Research (no month, 2011), vols. 287-290. Trans Tech Publications, pp. 564-568.*
Nilges et al., "Electrochemistry for Biofuel Generation: Production of Furans by Electrocatalytic Hydrogenation of Furfurals," Energy Environ. Sci. (no month, 2013), vol. 6, pp. 2925-2931.*
Parpot et al., "Electrochemical Investigations of the Oxidation-Reduction of Furfural in Aqueous Medium Application to Electrosynthesis," Electrochimica Acta (no month, 2004), vol. 49, pp. 397-403.*

(Continued)

Primary Examiner — Edna Wong
(74) Attorney, Agent, or Firm — Bell & Manning, LLC

(57) ABSTRACT

Electrochemical cells and photoelectrochemical cells for the reduction of furfurals are provided. Also provided are methods of using the cells to carry out the reduction reactions. Using the cells and methods, furfurals can be converted into furan alcohols or linear ketones.

22 Claims, 9 Drawing Sheets

(56) References Cited

OTHER PUBLICATIONS

Hansen et al., Cu catalyzed oxidation of 5-hydroxymethylfurfural to 2,5-diformylfuran and 2,5-furandicarboxylic acid under benign reaction conditions, Applied Catalysis A: General 456, Feb. 21, 2013, pp. 44-50.
Bragd et al., TEMPO-mediated oxidation of polysaccharides: survey of methods and applications, Topics in Catalysis, vol. 27, Nos. 1-4, Feb. 2004, pp. 49-66.
International Search Report and Written Opinion mailed in PCT Application No. PCT/US16/12312, dated May 10, 2016.
Grabowski et al., The electrochemical oxidation of 5-hydroxymethylfurfural with the nickel oxide/hydroxide electrode, Electrochimica Acta, vol. 36. No. 13, 1991, pp. 1995.
Cha et al., Combined biomass valorization and hydrogen production in a photoelectrochemical cell, Nature Chemistry, vol. 7, Mar. 9, 2015, pp. 328-333.
Strasser et al., Oxidation of biomass derived 5-hydroxymethylfurfural using heterogeneous and electrochemical catalysis, Catalysis Today 195, Jun. 8, 2012, pp. 144-154.
Cottier et al., Oxidation of 5-Hyrodxymethylfurfural and Derivatives to Furanaldehydes with 2,2,6,6-Tetramethylpiperidine Oxide Radical—Co-oxidant Pairs, J. Heterocyclic Chem. (May-Jun. 1995), vol. 32, pp. 927-930.
Palmisano et al., Waste-Free Electrochemical Oxidation of Alcohols in Water, Adv. Synth. Catal. 348, 2006, pp. 2033-2037.
Chadderdon et al., Electrocatalytic oxidation of 5-hydroxymethylfurfural to 2,5-furandicarboxylic acid on supported Au and Pd bimetallic nanoparticles, Green Chem. 16, Apr. 24, 2014, pp. 3778-3786.
Kwon et al., Electrocatalytic Hydrogenation of 5-Hydroxymethylfurfural in the Absence and Presence of Glucose, ChemSusChem 6, Jul. 15, 2013, pp. 1659-1667.
Nilges et al., Electrochemistry for biofuel generation: production of furans by electrocatalytic hydrogenation of furfurals, Energy Environ. Sci. 6, Aug. 6, 2013, pp. 2925-2931.
Vuyyuru et al., Oxidation of biomass derived 5-hydroxymethylfurfural using heterogeneous and electrochemical catalysis, Catalysis Today 195, Jun. 8, 2012, pp. 144-154.
Presentation by John Roylance at job interview, Aug. 2014.
McDonald et al., A new electrochemical synthesis route for a BiOI electrode and its conversion to a highly efficient porous BiVO4 photoanode for solar water oxidation, Energy Environ. Sci. 5, 2012, pp. 8553-8557.
Seabold et al., Efficient and Stable Photo-Oxidation of Water by a Bismuth Vanadate Photoanode Coupled with an Iron Oxyhydroxide Oxygen Evolution Catalyst, J. Am. Chem.Soc. 134, Jan. 20, 2012, pp. 2186-2192.
Park et al., Progress in bismuth vanadate photoanodes for use in solar water oxidation, Chem. Soc. Rev. 42, Oct. 23, 2012, pp. 2321-2337.
Kim et al., Nanoporous BiVO4 Photoanodes with Dual-Layer Oxygen Evolution Catalysts for Solar Water Splitting, Science 343, Feb. 28, 2014, pp. 990-994.
Wei et al., Photoelectrochemical Cell and Its Applications in Optoelectronics, Int. J. Electrochem. Sci., vol. 2, Oct. 20, 2007, pp. 897-912.

\* cited by examiner

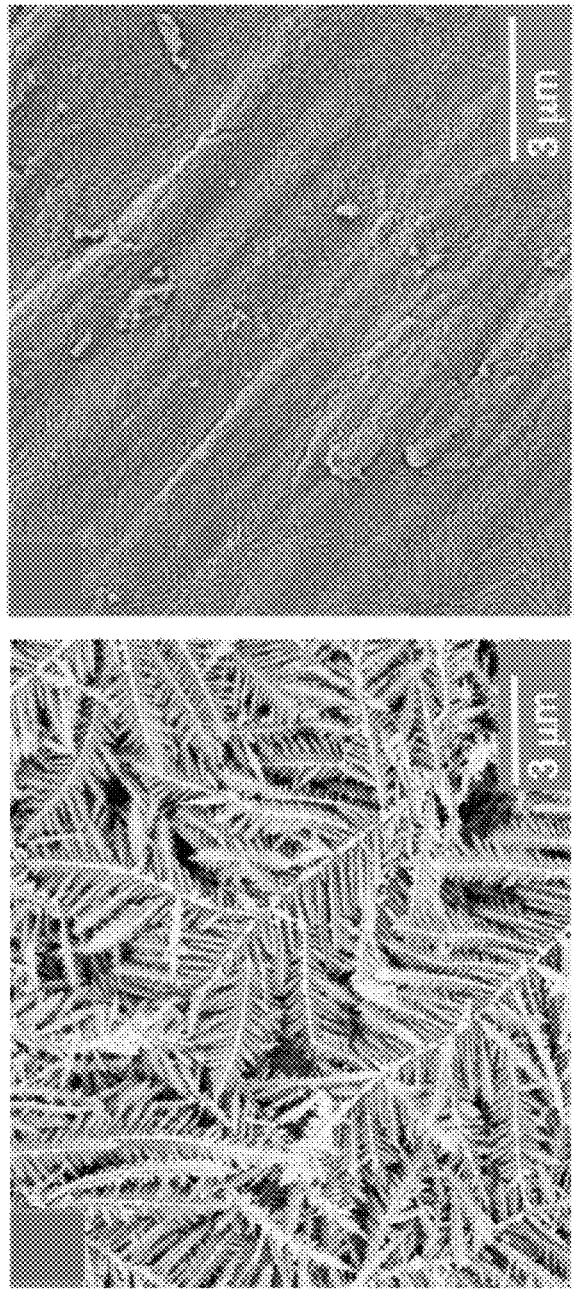

ELECTROCHEMICAL AND PHOTOELECTROCHEMICAL REDUCTION OF FURFURALS

REFERENCE TO GOVERNMENT RIGHTS

This invention was made with government support under DE-SC0008707 awarded by the US Department of Energy. The government has certain rights in the invention.

BACKGROUND

Biomass conversion can provide a viable pathway to minimize our dependence on petroleum products for generating both fuels and organic chemicals used in various industrial processes. In particular, the conversion of cellulosic matter, the most abundant organic material on earth, is of great interest because it can provide numerous chemicals and materials. 5-hydroxymethylfurfural (HMF) is one of the most important intermediates of biomass conversion and is obtained by the dehydration of hexoses, most predominantly fructose and glucose. HMF can undergo oxidation, reduction, and etherification to produce a variety of important chemicals. Of the many HMF reduction products, 2,5-bis (hydroxymethyl)furan (BHMF), which is produced by reduction of the formyl group of HMF, is an important starting molecule for various industrially important polymerization or etherification processes (e.g. those use in the production of biodiesel, polyester, and polyurethane foams).

To date, the conversion of HMF to BHMF has been mainly achieved by using $H_2$ as the hydrogen source in a pressurized cell (28-350 bars) operating at high temperatures (403-423 K) using various heterogeneous catalysts such as PtO, Pt/C, Ru/CeO$_x$, Ru/C, and 2CuO.Cr$_2$O$_3$ and Au/Al$_2$O$_3$. Considering that $H_2$ itself is a valuable energy source that must be produced from other primary sources with an energy input, enabling hydrogenation without consuming $H_2$ would provide an exciting, alternative pathway for reductive biomass conversion.

Recently, the possibility of electrochemically reducing HMF to BHMF and other reduced species utilizing $H^+$ or $H_2O$ as the hydrogen source was demonstrated. (See Y. Kwon, E. de Jong, S. Raoufmoghaddam, M. T. M. Koper, Electrocatalytic hydrogenation of 5-hydroxymethylfurfural in the absence and presence of glucose. Chem Sus Chem 6, 1659-1667 (2013); and P. Nilges, U. Schroder, Electrochemistry for biofuel generation: production of furans by electrocatalytic hydrogenation of furfurals. Energy Environ. Sci. 6, 2925-2931 (2013).) This process is very appealing because it does not consume $H_2$ and also because the reaction can be carried out at an ambient pressure and temperature. However, in order to make electrochemical biomass conversion a reality, development of catalytic electrodes that can simultaneously achieve high efficiency, selectivity, and yield is be critical. In addition, a strategy to minimize the electrical energy input necessary to drive the reduction process is required to make the electrochemical conversion truly energy efficient.

SUMMARY

Electrochemical cells and photoelectrochemical cells for the reduction of furfurals are provided. Also provided are methods of using the cells to carry out electrochemical and photoelectrochemical reduction reactions. Using the cells and methods, furfurals can be converted into furan alcohols or linear ketones.

One embodiment of a method for the electrochemical reduction of a furfural to a furan alcohol is carried out in an electrochemical cell comprising: an anode in an anode electrolyte solution; and a cathode in a cathode electrolyte solution, wherein the cathode electrolyte solution comprises a furfural and the cathode is in electrical communication with the anode and comprises a material that is catalytically active for the reduction of the furfural to the furan alcohol. The method comprises: creating a potential difference between the anode and the cathode to provide a flow of electrons from the anode to the cathode, wherein the electrons at the cathode undergo reduction reactions with the furfural to form the furan alcohol at a yield of at least 90%. In some embodiments of the methods and cells, the cathode comprises silver having a dendritic fractal morphology.

One embodiment of a method for the photoelectrochemical reduction of a furfural to a furan alcohol is carried out in a photoelectrochemical cell comprising: an anode in an anode electrolyte solution; and a cathode in a cathode electrolyte solution comprising a furfural, wherein the anode and cathode are in electrical communication and at least one of the anode and the cathode is a photoelectrode comprising a semiconductor. The method comprises: exposing the at least one photoelectrode to radiation that is absorbed to produce electron-hole pairs, wherein electrons are transported to the electrolyte-cathode interface where they undergo reduction reactions with the furfural to form the furan alcohol and holes are transported to the electrolyte-anode interface where they induce an oxidation reaction.

One embodiment of a method for the conversion of furfurals is carried out in an electrochemical cell comprising: an anode in an anode electrolyte solution; and a cathode comprising zinc in an acidic cathode electrolyte solution comprising a furfural; wherein the cathode is in electrical communication with the anode. The method comprises: creating a potential difference between the anode and the cathode to provide a flow of electrons from the anode to the cathode, wherein the electrons at the cathode undergo reduction reactions with the furfural to form a linear ketone.

One embodiment of a method for the photoelectrochemical reduction of a furfural to a linear ketone is carried out in a photoelectrochemical cell comprising: an anode in an anode electrolyte solution; and a cathode comprising zinc in an acidic cathode electrolyte solution comprising a furfural, wherein the anode and the cathode are in electrical communication and at least one of the anode and the cathode is a photoelectrode comprising a semiconductor. The method comprises: exposing the at least one photoelectrode to radiation that is absorbed to produce electron-hole pairs, wherein electrons are transported to the electrolyte-cathode interface where they undergo reduction reactions with the furfural to form the linear ketone and holes are transported to the electrolyte-anode interface where they induce an oxidation reaction.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 1(A). SEM image of $Ag_{gd}$ electrodes.

FIG. 1(B). SEM image of $Ag_{sp}$ electrodes.

DETAILED DESCRIPTION

Electrochemical cells (ECs) and photoelectrochemical cells (PECs) for the reduction of furfurals are provided. Also provided are methods of using the cells to carry out electrochemical and photoelectrochemical reduction reactions. Using the cells and methods, furfurals can be converted into furan alcohols or linear ketones.

The cells and methods are able to convert HMF, a common biomass-derived intermediate, into organic building block molecules that are useful in the production of a variety of chemicals. The reduction products include 2,5-hexanedione (HD), which can be converted to 2,5-dimethylfuran (DMF), a highly efficient biofuel. The reductions can be conducted under mild conditions at ambient temperatures and pressures (e.g., about 23° C. and about 1 atm) using water, an abundant hydrogen source. Even under these mild conditions, the furfural reduction competes favorably with water reduction to provide furfural reduction products with high yields and selectivities. This is advantageous because the electrochemical and photoelectrochemical reduction of furfurals, such as HMF, to furan alcohols, such as BHMF, is thermodynamically more favorable than the reduction of water and because it eliminates inefficiencies related to the production, storage and use of $H_2$. In addition, when the reduction reactions are used as the cathode reactions in a PEC the energy efficiency of the cells is enhanced by the use of photogenerated charge carries.

Figures 4A, 4B:
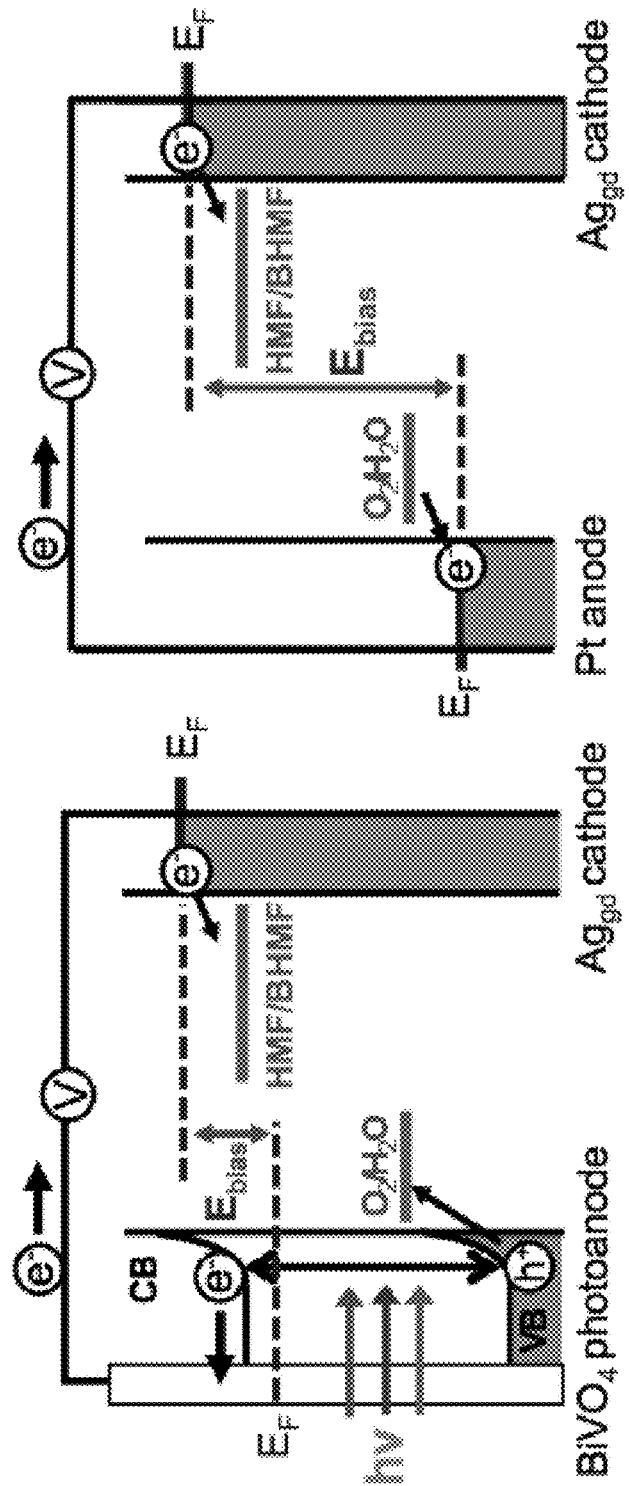
FIG. 4(A). Schematic diagram showing the external bias necessary to achieve HMF reduction in a photoelectrochemical cell.
FIG. 4(B). Schematic diagram showing the external bias necessary to achieve HMF reduction in a electrochemical cell.

One aspect of the present technology provides cells and methods for the electrochemical or photoelectrochemical reduction of furfurals to furan alcohols via hydrogenation. An embodiment of an EC for carrying out the electrochemical reduction of the furfurals comprises an anode in an anode electrolyte solution; and a cathode in a cathode electrolyte solution. The electrolyte solutions may be aqueous or non-aqueous. However, if a non-aqueous cathode solution is used, a proton donor should be provided and the electrolyte and solvent should not be electrochemically active within the range of HMF reduction. The cathode electrolyte solution comprises a furfural. The cathode, which is in electrical communication with the anode, comprises a material that is catalytically active for the reduction of the furfural to a furan alcohol. The operation of the EC is illustrated in FIG. 4B and described in detail in the Example 1. A more general description of electrochemical reduction of HMF in an aqueous electrolyte solution is provided here. To operate the EC, one or more voltage sources are used to create a potential difference between the anode and the cathode, such that a flow of electrons from the anode to the cathode through and external wire results. The electrons at the surface of the cathode then undergo reduction reactions with the furfurals in the cathode electrolyte solution, while oxidation reactions occur at the anode.

An embodiment of a PEC for carrying out the electrochemical reduction of the furfurals comprises an anode in an anode electrolyte solution; and a cathode in an aqueous cathode electrolyte solution. At least one of the anode and the cathode is a photoelectrode comprising an n-type or p-type semiconductor, respectively. The cathode electrolyte solution comprises an electrolyte and a furfural. As in the EC, the cathode is in electrical communication with the anode and comprises a material that is catalytically active for the reduction of the furfural to a furan alcohol. The operation of the PEC is illustrated in FIG. 4A and described in detail in Example 1. In this PEC, the anode is a photoanode. A more general description of the photoelectrochemical reduction of furfurals in an aqueous electrolyte solution is provided here. To operate the PEC, a photoanode comprising a semiconductor material is irradiated with electromagnetic radiation to create electron-hole pairs, which are separated in the photoanode. The electrons are then driven through an external wire from the photoanode to the cathode. A potential may be applied to the photoanode to help drive the PEC reactions. The electrons at the surface of the cathode then undergo reduction reactions with the furfural in the cathode electrolyte solution, while oxidation reactions occur between holes at the surface the photoanode and species contained in the anode electrolyte solution. An advantage of the PEC is that, by using solar radiation to drive the oxidation and reduction reactions, the cell operation becomes more efficient from an energy usage standpoint.

In the embodiments of the EC and PEC shown in FIGS. 4A and 4B HMF is reduced to BHMF. BHMF is useful because it can be used as a cross-linking agent in the production of polymers, such as polyurethanes. However, the cells can be used to reduce other furfurals to other furan alcohols, as discussed below. The anode reaction illustrated in FIGS. 4A and 4B is the oxidation of water to oxygen. However, other anode reactions can be employed.

The photoanode in the PEC may be composed of a variety of semiconductors. In some embodiments of the PECs, the photoanode comprises n-type $BiVO_4$, desirably nanoporous $BiVO_4$ with a coating of one or more oxygen evolution catalysts. Methods of fabricating an n-type $BiVO_4$ photoanode are described in Kim, T. W. & Choi, K.-S. Nanoporous $BiVO_4$ Photoanodes with Dual-Layer Oxygen Evolution Catalysts for Solar Water Splitting. *Science* 343, 990-994 (2014). Although the cathode in the PEC of FIG. 4A is not a photocathode, a photocathode comprising a p-type semiconductor can be used instead of, or in addition to, a photoanode.

Cathode materials that are catalytically active for the reduction of furfurals to furan alcohols include silver and indium. An example of a catalytically active cathode material that works well is silver having a dendritic fractal morphology, as shown in FIG. 1A. The catalytically active material may be supported or unsupported. For example, the cathode may comprise a film or particles of the catalytically active material on a non-catalytic substrate. If the reduction is conducted in a PEC, the cathode may be a photocathode comprising a substrate comprising a p-type semiconductor, the surface of which is partially coated with the catalytically active material. In a PEC that includes a photocathode, photogenerated electron-hole pairs are created and then separated in the p-type semiconductors and the electrons are transported to the catalytically active material where they are consumed in the reduction reactions.

Figure 5:
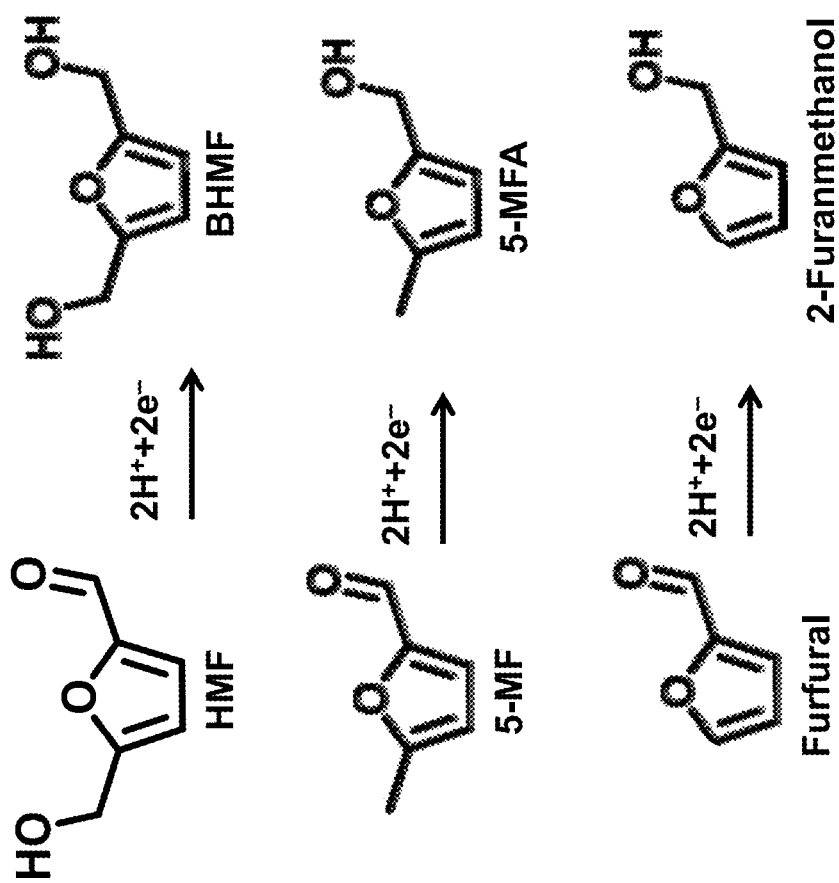
FIG. 5. The reduction schemes for the hydrogenation of HMF, 5-methylfurfural and furfural using $H^+$ from $H_2O$ as the hydrogen source FIG. 6. LSVs of Zn electrodes in 0.2 M sulfate buffer (pH 2) without and with 0.02 M HMF. Scan rate: 5 mV/s, 3 cm$^2$ electrodes.

In addition to HMF, the furfurals that can be electrochemically or photoelectrochemically reduced include furfural itself (furan-2-carbaldehyde), which can be reduced to 2-furanmethanol. The furfurals further include furfurals with different ring substituents, such as hydroxyl or alkyl substituents. These include 5-methylfurfural (5-MF), which can be reduced to 5-methylfurfuryl alcohol (5-MFA). 5-MFA is an intermediate in the production of DMF. The reduction schemes for the hydrogenation of HMF, 5-MF and furfural using $H^+$ from $H_2O$ as the hydrogen source are shown in FIG. 5.

The present electrochemical and photoelectrochemical furfural reductions to furan alcohols can be carried out in cathode electrolyte solutions at relatively low pH. For example, using the present cells and methods, HMF can undergo reduction at a pH of 10 or lower. This includes embodiments of the cells and methods in which HMF is reduced at a pH of 9.5 or lower. The use of lower pH solutions is advantageous because HMF is more stable under these conditions, however, higher pH conditions can be used. For example, the reductions can be carried out in a pH range from about 6 to about 11, including in the range from 8 to 10. Higher pH conditions will work, but at higher pH polymerization products may become significant. Lower pH conditions will also work, but may generate a smaller yield of the alcohols, with other products (e.g., ring-opening) and water reduction becoming more dominant. The solutions may be buffered to maintain a given pH. The electrolyte solvent for the anode may be the same as or different from that of the cathode and may be aqueous or non-aqueous.

The electrochemical and photoelectrochemical reduction of furfurals can be carried out substantially completely to provide products at a high yield with high selectivity. For example, the furfurals can be converted into furan alcohols with a furan conversion of at least 80%, a product yield of at least 80% and/or a product selectivity of at least 80%. This includes embodiments of the cells and methods that provide furan conversions, furan alcohol yields and/or furan alcohol product selectivities of at least 85%, at least 90%, at least 95% and at least 99%. Methods for quantifying conversions and yields are described in the examples that follow.

Another aspect of the present technology provides cells and methods for the electrochemical or photoelectrochemical reduction of furfurals to linear ketones via reductive ring opening, which may occur through a pseudo-Clemmensen reduction. The electrochemical and photoelectrochemical reduction of furfurals to form linear ketones can be carried out in ECs and PECs having the same construction and general operating principles as those shown in FIGS. 4A and 4B. However, the cathode in the cells for linear ketone production comprise zinc as a catalyst for the furfural ring opening reactions in place of a material that is catalytically active for the reduction of the furfural to the furan alcohol. Also, in the cells for linear ketone production, the cathode electrolyte solution is acidic. As in the case of furfural reduction to furan alcohols, a variety of anode reactions, including the oxidation of water to oxygen, can be employed.

In order to promote the formation of the linear ketones, the electrolyte solution desirably has a pH of no greater that about 5, more desirably no greater than about 4 and still more desirably no greater than about 2.5. In some embodiments of the ECs and PECs, the cathode electrolyte solution has a pH of about 2. Lower pH conditions can be used, however, if the pH is too low the acidic conditions may lead to HMF polymerization. The cathode electrolyte solution may comprise a pH buffer in order to maintain a stable pH throughout the reduction.

Figure 7:
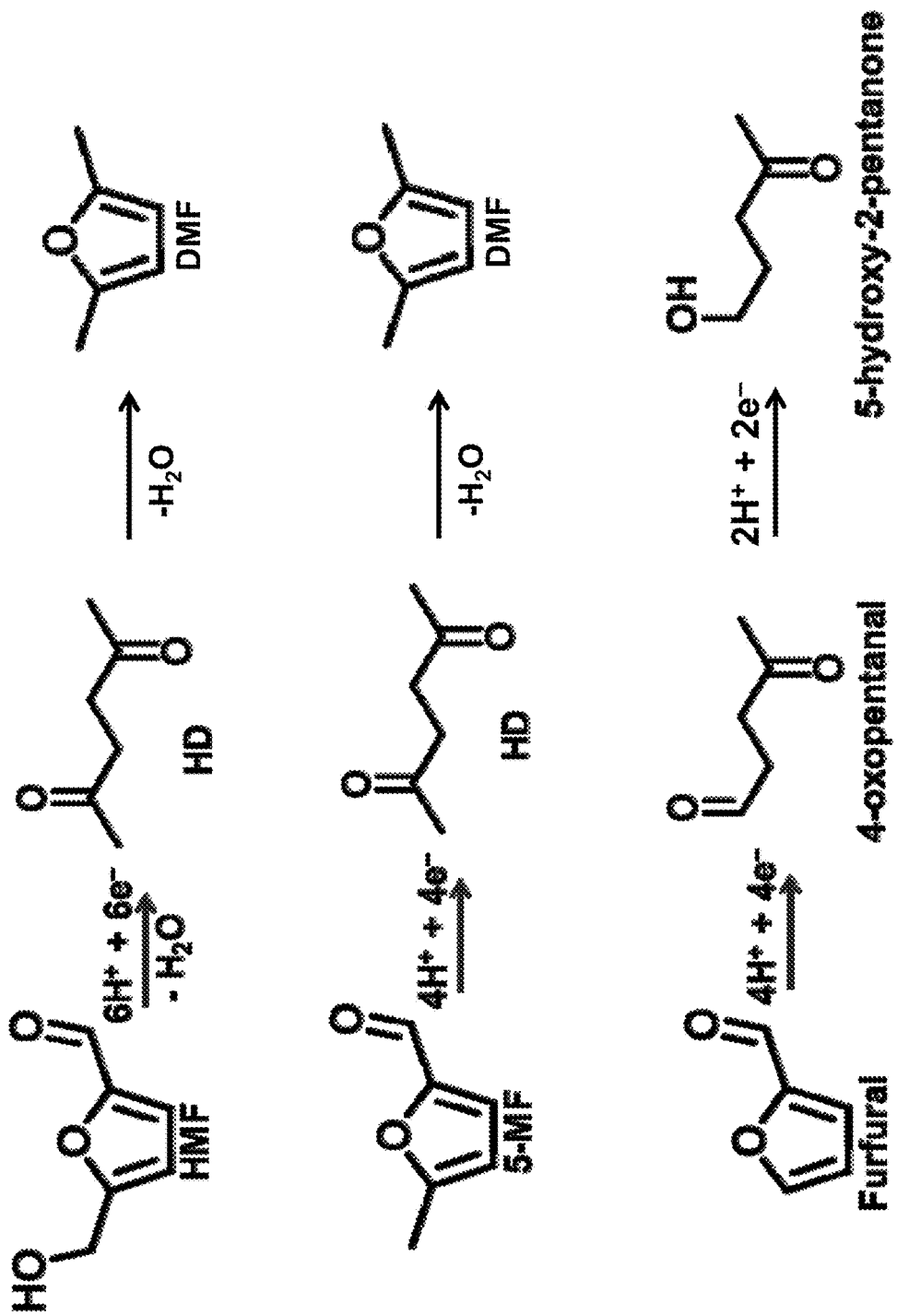
FIG. 7. The reduction schemes for the reductive ring opening of HMF, 5-methylfurfural and furfural.

Furfurals that can be converted into linear ketones include, but are not limited to, HMF, 5-MF and furan-2-carbaldehyde (furfural). HMF and 5-MF are reduced to HD, while furan-2-carbaldehyde is reduced to 4-oxopentanal. The 4-oxopentanal can then be further reduced to 5-hydroxy-2-pentanone. The reduction schemes for HMF, 5-MF and furfural using $H^+$ from $H_2O$ as the hydrogen source are shown in FIG. 7.

As shown in the figure, the reduction product HD can subsequently be converted into DMF via dehydration. Thus, the present cells and methods provide a critical step in a pathway to DMF production.

The electrochemical and photoelectrochemical reduction of furfurals can be carried out substantially completely to provide products at a high yield with high selectivity. For example, the furfurals can be converted into linear ketones with a product yield of at least 70%. This includes embodiments of the cells and methods that provide a linear ketone yield of at least 75%, at least 80% and at least 85%.

Example 1

This example demonstrates the reduction of HMF to BHMF with Ag catalytic electrodes, which achieved Faradaic efficiency (FE) and yield nearing 100%, using $H_2O$ as the hydrogen source under ambient pressure and temperature. It further demonstrates the construction of a photoelectrochemical cell where solar energy can be directly utilized for HMF reduction to BHMF, decreasing the external energy input necessary for reduction. Previously, for cleaner and more sustainable biomass conversion, it was envisioned that the $H_2$ gas required for reductive biomass conversion would be provided from $H_2$ produced by renewable sources such as solar water splitting. However, an even more attractive and energy efficient route would be the direct utilization of solar energy and water for HMF reduction without involving the formation of $H_2$. The photoelectrochemical cell presented in this example demonstrates the feasibility of this approach, which can eliminate multiple issues dealing with production, storage, and use of $H_2$, all of which require significantly more energy and costs.

When HMF is reduced in an aqueous solution, water reduction to $H_2$ is the major competing reaction. Therefore, in order to increase the FE of HMF reduction, electrodes that are poorly catalytic for the $H_2$ evolution reaction, such as silver and copper, were investigated, which revealed that Ag electrodes are the more effective for BHMF formation. High surface area Ag electrodes used in this study were prepared by galvanically displacing a piece of commercially available Cu foil with Ag in a 0.05 M $AgNO_3$ solution for 30 s. The resulting Ag electrode obtained is referred to as $Ag_{gd}$ for the rest of this example. The displacement reaction was kinetically fast and quickly depleted $Ag^+$ ions at the Cu surface. As a result, the growth of Ag was limited by diffusion of $Ag^+$ ions, and Ag electrodes with a dendritic fractal morphology were obtained (FIG. 1A). This morphology is favorable for increasing surface area while maintaining good electrical continuity between Ag crystals.

For comparison, Ag films with flat and smoother surfaces were also prepared by sputter coating Ag onto Cu foil, which will be referred to as $Ag_{sp}$ (FIG. 1B). The X-ray diffraction (XRD) patterns of $Ag_{gd}$ and $Ag_{sp}$ electrodes were obtained. Both films were composed of crystalline Ag and no other crystalline impurity peaks (e.g. $Ag_2O$, AgO) were observed.

Figure 2A:
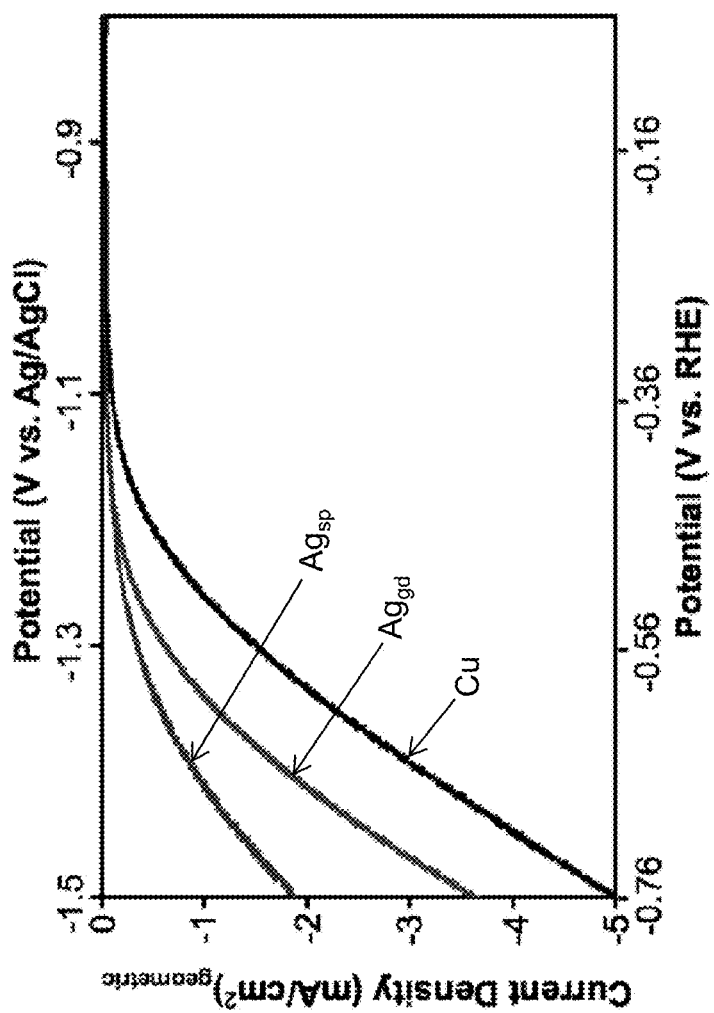
FIG. 2(A). Linear Sweep Voltammetry curves (LSVs) of Cu, $Ag_{sp}$, and $Ag_{gd}$ electrodes in 0.5 M borate buffer (pH 9.2) without 0.02 M HMF (scan rate: 5 mV/s).

The electrocatalytic properties of Ag electrodes for HMF reduction were first examined by performing linear sweep voltammetry (LSV) in an undivided cell containing a 0.5 M borate buffer solution (i.e. 0.5 M boric acid adjusted to pH 9.2 with sodium hydroxide) with and without 0.02 M HMF (FIG. 2). The LSV of the Cu foil used as the substrate for preparing Ag electrodes was also performed for comparison. The LSVs were measured using a three-electrode system composed of a Pt counter electrode and a Ag/AgCl (4 M KCl) reference electrode. The results were plotted both against Ag/AgCl and against the reversible hydrogen electrode (RHE). The latter allows easy interpretation of the data against the thermodynamic water reduction potential to $H_2$ in the pH condition used in this example.

The cathodic currents observed in the solution without HMF are due to the reduction of water to $H_2$ (FIG. 2A), which show that Cu is a poor electrocatalyst for $H_2$ production, requiring an overpotential of 0.52 V to achieve a current density of 1 $mA/cm^2$. The results also show that both $Ag_{gd}$ and $Ag_{sp}$ electrodes were even poorer catalysts than the Cu electrode, requiring even more overpotential for $H_2$ production. The potentials required to generate 1 $mA/cm^2$ of current density for water reduction are −0.60 V and −0.67 V vs. RHE for $Ag_{gd}$ and $Ag_{sp}$ electrodes, respectively. While $Ag_{gd}$ and $Ag_{sp}$ show similar cathodic onset potentials for $H_2$ evolution, the current increases more rapidly for the $Ag_{gd}$ when the potential sweeps to the negative direction due to the high surface area of its dendritic morphology.

Figure 2B:
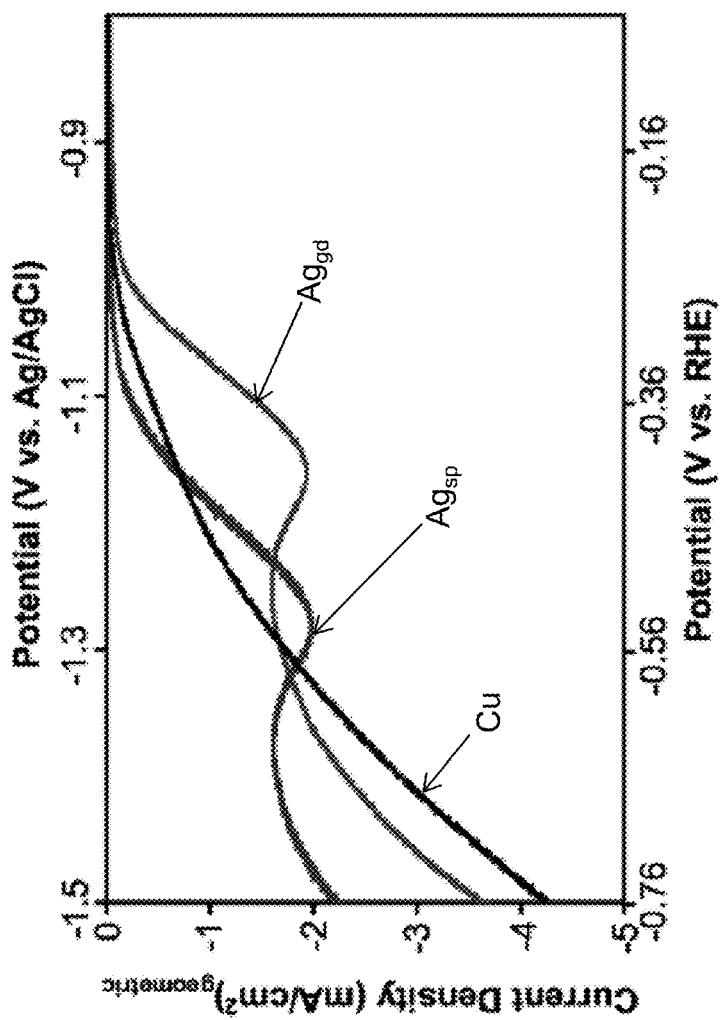
FIG. 2(B) LSVs of Cu, $Ag_{sp}$, and $Ag_{gd}$ electrodes in 0.5 M borate buffer (pH 9.2) with 0.02 M HMF (scan rate: 5 mV/s).

When 0.02 M HMF was added to the solution, all electrodes showed a shift of the cathodic current onset potential to the positive direction (FIG. 2B). This indicates that HMF reduction is easier than water reduction on the Ag and Cu electrodes. In particular, while $Ag_{gd}$ and $Ag_{sp}$ showed similar onset potential for water reduction, the onset potential of $Ag_{gd}$ for HMF reduction was significantly more positive than that of $Ag_{sp}$. In fact, it was even more positive than that of Cu foil, indicating that $Ag_{gd}$ is particularly catalytic for HMF reduction. The potentials required to generate 1 $mA/cm^2$ of current density for HMF reduction are −0.33 V, −0.44 V, and −0.48 V vs. RHE, respectively, for $Ag_{gd}$, $Ag_{sp}$, and Cu foil.

In order to analyze reduction products and determine conversion efficiencies, HMF reduction was carried out in a divided cell at a constant potential of −1.3 V vs. Ag/AgCl (equivalent to −0.56 V vs. RHE) by passing 20 C in 14 mL of 0.5 M borate buffer solution containing 0.02 M HMF. After reduction, the electrolyte was analyzed by $^1$H-NMR to quantify the amounts of BHMF and remaining HMF. Based on these results, FE and yield for BHMF formation, which are summarized in Table 1, were calculated using the following equations.

$$FE(\%) = \frac{\text{mol of BHMF}}{\text{Total charge passed}/(F \times 2)} \times 100 \quad (1)$$

$$\text{Yield of BHMP}(\%) = \frac{\text{mol of BHMF formed}}{\text{mol of HMF consumed}} \times 100 \quad (2)$$

TABLE 1

Results obtained for electrochemical HMF reduction to BHMF by $Ag_{gd}$, $Ag_{sp}$, and Cu electrodes at E = −1.3 V vs. Ag/AgCl (=−0.56 V vs. RHE) for 20 C passed.

| Electrode | Average current density ($mA/cm^2$) | HMF consumed (μmol) | BHMF formed (μmol) | Rate for BHMF production (μmol/h · $cm^2$) | FE (%) | Yield (%) |
|---|---|---|---|---|---|---|
| $Ag_{gd}$ | 6.24 | 103 | 102 | 114 | 98.1 | 98.6 |
| $Ag_{sp}$ | 2.46 | 86.1 | 74.2 | 32.8 | 71.6 | 86.2 |
| Cu | 1.32 | 52.5 | 19.9 | 4.7 | 19.2 | 37.9 |

The FE and yield for BHMF formation by the $Ag_{gd}$ electrode were, remarkably, 98.1% and 98.6%, respectively. This means that formation of $H_2$ and other HMF reduction products is negligible. The FE and yield for BHMF formation were 71.6% and 86.2%, respectively, for the $Ag_{sp}$ electrode and 19.2% and 37.9%, respectively, for the Cu foil electrode. The decrease in yield was due to the formation of C—C bonds between HMF molecules, mainly between a carbonyl carbon of one HMF molecule and a carbon of the furan ring of another HMF molecule, forming dimeric and polymeric species based on the NMR data. Other commonly expected hydrogenation or hydrogenolysis products of HMF that do not involve HMF-HMF reactions, such as 5-methylfurfural, 5-methylfurfuryl alcohol, or 2,5-dimethylfuran, were not detected. The FEs of the $Ag_{sp}$ and Cu foil electrodes, which are much lower than their yields for BHMF formation, indicate that part of the cathodic current was used for $H_2$ production.

In addition to FE and yield, the conversion rate of HMF to BHMF per unit geometric area of electrode, which depends both on the FE and the magnitude of current density, can be another important criterion for evaluating the efficiency of the reduction process; even if the FE is high, if the current density itself is low, the conversion rate can be slow. Table 1 shows that $Ag_{gd}$ not only exhibits the highest FE but also the highest average current density. As a result, the conversion rate by $Ag_{gd}$ is more than 3 times and 24 times faster than those of $Ag_{sp}$ and Cu, respectively.

After electrolysis, the composition, crystallinity, and morphology of the $Ag_{gd}$ electrode were reexamined. No sign of instability or deformation of the Ag surface or composition was observed.

Electrochemical HMF reduction was also performed using the $Ag_{gd}$ electrode at various applied potentials, which can provide mechanistic insights for potential-dependent HMF reduction. The results are summarized in Table 2.

TABLE 2

Results obtained for electrochemical HMF reduction to BHMF by a $Ag_{gd}$ electrode at various potentials for 20 C passed.

| Potential (V vs. Ag/AgCl) | Average current density ($mA/cm^2$) | HMF consumed (μmol) | BHMF formed (μmol) | Rate for BHMF production (μmol/h · $cm^2$) | FE (%) | Yield (%) |
|---|---|---|---|---|---|---|
| −1.0 | 0.414 | 60.4 | 27.4 | 2.04 | 26.4 | 45.4 |
| −1.05 | 1.21 | 99.6 | 63.4 | 13.7 | 61.1 | 63.6 |

TABLE 2-continued

Results obtained for electrochemical HMF reduction to BHMF
by a $Ag_{gd}$ electrode at various potentials for 20 C passed.

| Potential (V vs. Ag/AgCl) | Average current density (mA/cm$^2$) | HMF consumed (μmol) | BHMF formed (μmol) | Rate for BHMF production (μmol/h · cm$^2$) | FE (%) | Yield (%) |
|---|---|---|---|---|---|---|
| −1.1 | 2.47 | 101 | 81.7 | 36.3 | 78.8 | 81.0 |
| −1.2 | 2.94 | 103 | 88.6 | 46.8 | 84.8 | 85.8 |
| −1.3 | 6.24 | 103 | 102 | 114 | 98.1 | 98.6 |
| −1.4 | 7.06 | 102 | 101 | 128 | 97.4 | 98.5 |
| −1.5 | 7.97 | 101 | 99.1 | 139 | 95.6 | 97.8 |
| −1.6 | 10.2 | 96.2 | 93.6 | 171 | 90.3 | 97.3 |
| −1.7 | 12.0 | 87.6 | 85.7 | 185 | 87.1 | 97.8 |
| −1.8 | 17.1 | 61.4 | 60.1 | 185 | 58.0 | 98.0 |

Figure 3:
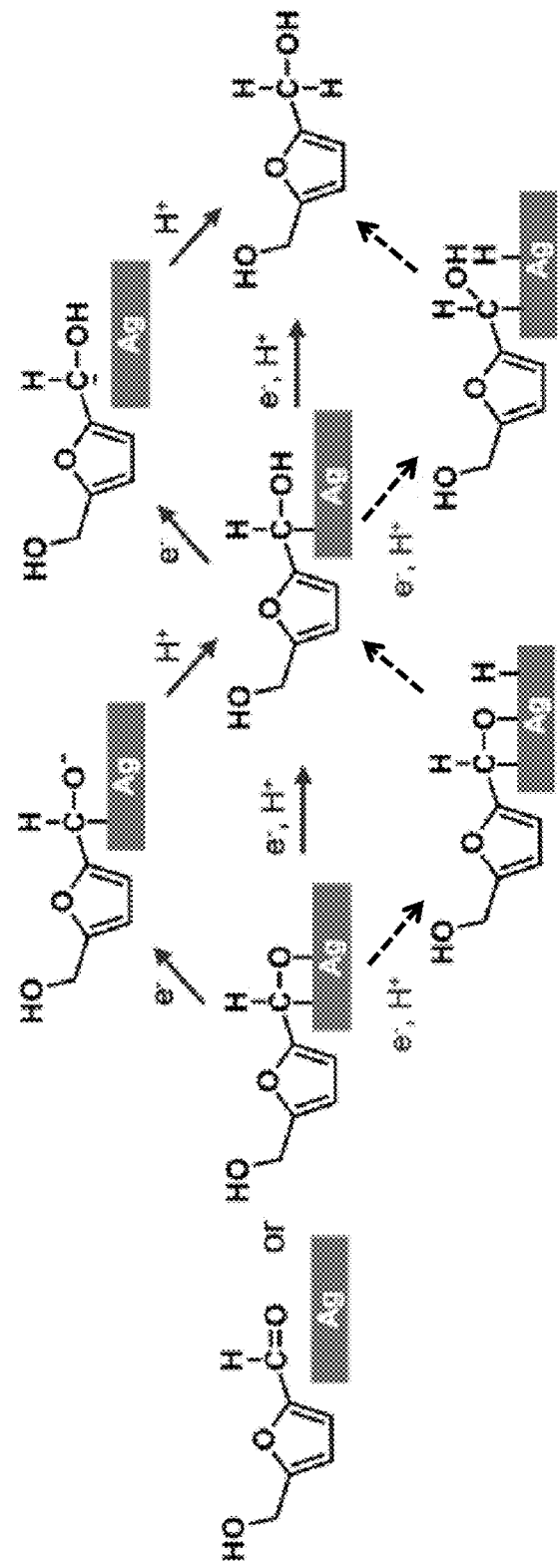
FIG. 3. Possible hydrogenation mechanisms for HMF. Solid arrows represent hydrogenation pathways that do not involve the formation of adsorbed H atom ($H_{ads}$). Dashed arrows indicate additional pathways available when the formation of $H_{ads}$ is enabled.

Based on the FEs and yields of BHMF, the reduction potential could be divided into three regions. The first region is −1.0 V≤E<−1.1 V vs. Ag/AgCl. In this region, the amount of BHMF formed was much less than the amount of HMF consumed, meaning that there is a competing reaction consuming HMF, which lowers both the FE and yield for BHMF formation. The major competing reaction was the reaction between HMF molecules, which is the same competing reaction observed for the Cu and $Ag_{sp}$ electrodes at −1.3 V vs. Ag/AgCl discussed above. The LSVs obtained without HMF (FIG. 2A) show that $H_2$ evolution on the $Ag_{gd}$ electrode initiates at −1.1 V vs. Ag/AgCl. Therefore, in this potential region, the reduction mechanism of HMF most likely does not involve the formation of surface adsorbed hydrogen atoms ($H_{ads}$), which is the first step for $H_2$ evolution. Then, HMF reduction proceeds either through e$^-$ transfer to an HMF molecule to form an anionic intermediate that further reacts with H$^+$ or through simultaneous e$^-$ transfer and H$^+$ transfer to HMF. Plausible mechanisms describing these pathways are shown in FIG. 3 with solid arrows. In this case, the surface of the $Ag_{gd}$ electrode is expected to be covered only with HMF or its reduction intermediates. As a result, reactions that form C—C bonds between HMF molecules and/or their reduction intermediates can be possible competing reactions in this potential region.

The second potential region is −1.1 V≤E<−1.6 V vs. Ag/AgCl where both the FE and yield for BHMF formation increase considerably and become near 100%. This suggests that the reactions between HMF molecules considerably diminish in this potential region. LSVs obtained without HMF (FIG. 2A) indicate that $H_2$ evolution and, therefore, the formation of $H_{ads}$ are possible on the $Ag_{gd}$ electrode surface in this region. This means new mechanisms that involve the formation of $H_{ads}$ for BHMF production are possible in this region, which are indicated with dashed arrows in FIG. 3. As the coverage of $H_{ads}$ increases on the electrode surface and the rate of BHMF formation increases, the probability of HMF molecules adsorbing in close enough proximity on the electrode surface decreases, and the HMF-HMF reactions can be effectively suppressed.

The third potential region is E≥−1.6 V vs. Ag/AgCl, where $H_2$ evolution competes with BHMF formation, lowering the FE for BHMF formation. However, since there is no competing reaction consuming HMF in this region, the amount of HMF consumed is also lowered. As a result, the yield for BHMF remains high in this region. In addition, since the current density in this high overpotential region is significantly increased, the conversion rates for BHMF are higher than those in the low overpotential regions.

The electrochemical reduction of HMF on $Ag_{gd}$ electrodes demonstrated that electrochemical hydrogenation can be achieved with high FE and yield without using $H_2$ as the hydrogen source. Therefore, this procedure has the potential of offering the mildest hydrogenation conditions for HMF. However, electrochemical hydrogenation requires an input of electrical energy to drive the reaction. Therefore, in order to make the overall conversion process more energy efficient, the possibility of directly utilizing solar energy to convert HMF to BHMF was investigated by constructing a photoelectrochemical cell.

The photoelectrochemical cell used an n-type $BiVO_4$ electrode as a photon absorber and as an anode (photoanode) and a $Ag_{gd}$ electrode as the cathode. The nanoporous $BiVO_4$ electrode used in this example was prepared using a method reported in a recent paper where it was used as a photoanode for a water splitting photoelectrochemical cell and demonstrated the highest applied bias photon-to-current efficiency among all oxide-based photoelectrodes reported to date. (See, T. W. Kim, K.-S. Choi, Nanoporous $BiVO_4$ photoanodes with dual-layer oxygen evolution catalysts for solar water splitting. Science 343, 990-994 (2014).) Because the bare surface of $BiVO_4$ is poorly catalytic for water oxidation, the surface of the $BiVO_4$ electrode was coated with dual layers (FeOOH and NiOOH) of oxygen evolution catalysts (OEC). The detailed synthesis methods and the role of dual layer OECs can be found elsewhere. (See, T. W. Kim, K.-S. Choi, Nanoporous $BiVO_4$ photoanodes with dual-layer oxygen evolution catalysts for solar water splitting. Science 343, 990-994 (2014).)

Under illumination, electron-hole pairs were generated and separated in $BiVO_4$. The holes were used at the $BiVO_4$ surface to oxidize water to $O_2$, while the photoexcited electrons in the conduction band (CB) of $BiVO_4$ were transferred to the $Ag_{gd}$ cathode to reduce HMF to BHMF (FIG. 4A). The cell reactions are summarized below. The standard free energy change (ΔG°) of the overall reaction at 298 K is calculated to be 211.20 kJ/mol. (See, Y. Park, K. J. McDonald, K.-S. Choi, Progress in bismuth vanadate photoanodes for use in solar water oxidation. Chem. Soc. Rev. 42, 2321-2337 (2013).)

Cathode Reaction:

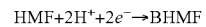

Anode Reaction:

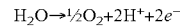

Overall:

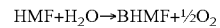

Since the photoexcited electrons in the CB of $BiVO_4$ already possess a significantly negative potential (~0.0 vs. RHE), the additional potential necessary to reduce HMF to BHMF can be decreased considerably. Also, since the valence band (VB) edge of $BiVO_4$ is located at ~2.4 V vs. RHE, the photogenerated holes in the VB of $BiVO_4$ have sufficient overpotential for water oxidation before applying any external bias, which decreases the external bias necessary for the cell operation. This is quite different from the case of an electrochemical cell where sufficient overpotentials for both the cathode reaction (HMF reduction) and for the anode reaction (water oxidation) need to be provided by the external bias (FIG. 4B).

Figure 4C:
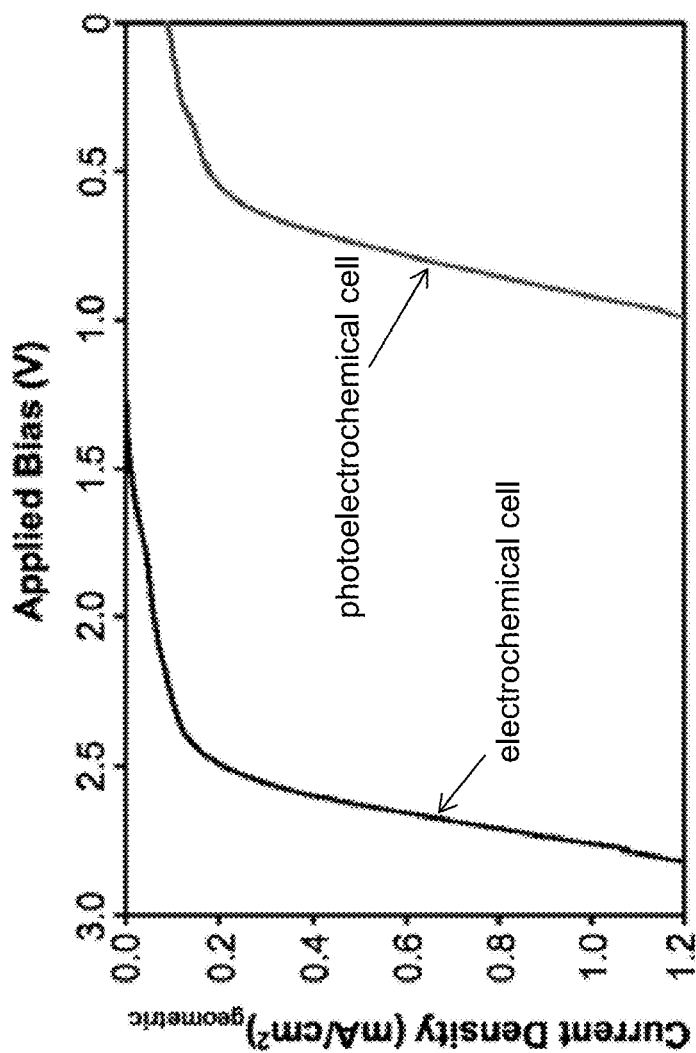
FIG. 4(C). LSVs obtained from a photoelectrochemical cell and an electrochemical cell for HMF reduction using a two-electrode setup in 0.5 M borate buffer (pH 9.2) containing 0.02 M HMF (scan rate: 5 mV/s, illumination for photoelectrochemical cell: AM 1.5 G, 100 mW/cm$^2$).

The advantage of using solar energy in decreasing external bias to reduce HMF is well demonstrated in FIG. 4C comparing an LSV obtained from an electrochemical cell composed of a $Ag_{gd}$ cathode and a Pt anode with that obtained from a photoelectrochemical cell composed of a $Ag_{gd}$ cathode and a $BiVO_4$ photoanode under AM 1.5 G illumination. The electrolyte was a 0.5 M borate buffer solution (pH 9.2) containing 0.02 M HMF. In order to achieve a current density of 1 mA/cm² in an electrochemical cell, application of 2.76 V between a $Ag_{gd}$ cathode and a Pt anode was necessary. However, when a photoelectrochemical cell is used, 1 mA/cm² was achieved at a potential of 0.92 V between the $BiVO_4$ photoanode and $Ag_{gd}$ cathode, saving about 2 V.

It should be noted that the LSVs shown in FIG. 4C were obtained using a two-electrode cell. This is critical for properly evaluating potential input necessary for the cell operation. LSVs obtained using a three electrode cell such as those shown in FIG. 2 display the change in current density when the potential between the working electrode (WE) and the reference electrode (RE) is varied. However, this experiment does not provide any information on the potential applied between the WE and the counter electrode (CE). Therefore, although the data obtained from a three-electrode cell is important for analyzing the reaction occurring at the WE at a precisely controlled potential against the RE, it cannot be used for evaluating the energy input or efficiency of the cell.

In order to analyze products, FE, and yield, photoelectrochemical reduction of HMF was carried out at a constant potential of 1.5 V between the $BiVO_4$ photoanode and the $Ag_{gd}$ cathode. According to the LSVs shown in FIG. 4C, electrochemical reduction of HMF at 1.5 V should be negligible when a two electrode cell is used. The results show that BHMF was produced with a FE of 94.1% and a yield of 94.8% (Table 3), confirming that the results obtained from electrochemical HMF reduction can be reproduced by a photoelectrochemical cell while decreasing the necessary electrical energy input. When the cell design is improved to minimize the potential loss in the solution and through the frit, and to facilitate the mass transport, external electrical energy input will be further reduced.

TABLE 3

Faradaic efficiency, selectivity, and conversion rate for BHMF formation from photoelectrochemical HMF reduction. A $Ag_{gd}$ working electrode and a $BiVO_4$ counter electrode (photoanode) were used at 1.0 V under illumination (AM 1.5G, 100 mW/cm²) for 5 C passed.

| Potential (V) | Average current density (mA/cm²) | HMF consumed (μmol) | BHMF formed (μmol) | Rate for BHMF production (μmol/h · cm²) | FE (%) | Yield (%) |
|---|---|---|---|---|---|---|
| 1.0 | 1.12 | 25.7 | 24.4 | 19.6 | 94.1 | 94.8 |

The successful photoelectrochemical reduction of HMF suggests numerous possibilities for performing reductive biomass conversion using solar energy and water as the hydrogen source under ambient conditions. While water reduction and $CO_2$ reduction have been mainly investigated as cathode reactions of photoelectrochemical cells to date, employing reductive biomass conversion reactions as cathode reactions of photoelectrochemical cells will provide more freedom in the construction of photoelectrochemical cells, which will increase the overall conversion efficiency while resolving practical issues such as collection and separation of reaction products.

Detailed Materials and Methods

1. Chemicals and Materials

Copper foil was purchased from Nimrod Hall Copper Foil Company. Boric acid (≥98.5%), sodium hydroxide (≥97%), and 5-hydroxymethylfurfural (≥99%) were purchased from Sigma Aldrich. Silver nitrate (99.9+%) was purchased from Alfa Aesar. To assist in method development, standard calibration, and product identification, 2,5-bis(hydroxymethyl)furan (97%) was purchased from Polysciences, Inc. All chemicals were used without further purification.

2. Preparation of Electrodes

Cu electrodes used in this study were prepared by cutting Cu foil to pieces with a dimension of 1.5 cm×2.5 cm. Cu tape was attached to the top of the Cu foil electrode to enable connection to the lead to the potentiostat. The backside and top 0.5 cm of the Cu foil were then covered with Teflon tape to yield a 3.0 cm² working area. $Ag_{gd}$ films were prepared by immersing clean Cu foil electrodes (1.5 cm×2.0 cm working area) into a 50.0 mM solution of $AgNO_3$ for 30 seconds. The concentration of the $Ag^+$ solution and the duration of deposition reported here are optimum conditions to produce uniform and adherent Ag electrodes. Increasing the $Ag^+$ concentration, which increased the deposition rate of Ag, resulted in poor adhesion of Ag on the Cu surface, while decreasing the $Ag^+$ concentration resulted in nonuniform coverage of Ag on the Cu surface. In a similar manner, increasing or decreasing the deposition time affected the adhesion or uniformity of the Ag deposition. To achieve good coverage and adhesion of Ag on the Cu, the Cu foil electrodes were cleaned just prior to deposition by rinsing with 2-propanol and water followed by immersing in 1 M HCl for 1 minute to remove surface oxides. They were then rinsed with water, dried, and immediately placed in the $AgNO_3$ solution. Following deposition, the film was rinsed gently with water and dried in an air stream. To prepare $Ag_{sp}$ electrodes, Cu foil substrates cleaned using aforementioned procedures were placed in a sputter coater (Anatech USA, DC/RF Dual Source Sputtering System) where 100 nm of Ag was sputter-coated onto the Cu substrate. The films were then made into electrodes in the same manner as for the Cu foil electrodes. The Pt counter electrodes were prepared by sputter coating a 100 nm platinum layer over a 20 nm titanium layer onto cleaned glass slides. The dimension of the working area of the Pt counter electrode was 2.0 cm×2.0 cm.

The nanoporous $BiVO_4$ electrode used in this study was prepared using a method reported in a recent paper where it was used as a photoanode for a water splitting photoelectrochemical cell. Because the bare surface of $BiVO_4$ is poorly catalytic for water oxidation, the surface of the $BiVO_4$ electrode was coated with dual layers (FeOOH and NiOOH) of oxygen evolution catalysts (OEC). The synthesis methods and the role of dual layer OECs can be found elsewhere.

3. Characterization $Ag_{gd}$ and $Ag_{sp}$ electrodes were characterized by powder X-ray diffraction (XRD) (Bruker D8 Advanced PXRD, 298 K, Ni-filtered Cu $K_\alpha$-radiation, $\lambda$=1.5418 Å). Aside from the underlying copper substrate, only crystalline Ag peaks were observed for both films. When XRD patterns of the electrodes were obtained again after passing 20 C for HMF reduction at −1.3 V vs. Ag/AgCl, no change was observed. The surface morphologies of the $Ag_{gd}$ and $Ag_{sp}$ electrodes were examined by Scanning Electron Microscopy (SEM) using a LEO 1530 microscope at an accelerating voltage of 5 kV before and after electrochemical HMF reduction at −1.3 V vs. Ag/AgCl. Again, no change was observed.

4. Electrochemical HMF Reduction

To investigate the catalytic abilities of Cu foil, $Ag_{gd}$, and $Ag_{sp}$ electrodes to reduce HMF, linear sweep voltammetry (LSV) was performed using solutions with and without HMF. The general experimental setup consisted of a three-electrode system (Cu or Ag working electrode, Pt counter electrode, and a Ag/AgCl (4 M KCl) reference electrode) in an undivided cell controlled by a Bio-Logic VMP2 potentiostat. A 0.5 M borate buffer solution (pH 9.2) with and without 0.02 M HMF was used as the electrolyte, which was purged with $N_2$ to remove dissolved oxygen prior to obtaining LSVs. The potential was swept to the negative direction from the open circuit potential to −1.5 V vs. Ag/AgCl at 5 mV/s without stirring. All current densities reported in this example were calculated based on the geometric area of the working electrode.

Constant potential electrolysis experiments were conducted to quantify products, yields, and Faradaic efficiency. A three-electrode setup was employed using an H-shaped cell divided by a glass frit. The Cu or Ag working electrode and the reference electrode were immersed in the cathodic compartment containing 14 mL of a 0.5 M borate buffer solution (pH 9.2) with 0.02 M HMF. The counter electrode was immersed in the anodic compartment containing 14 mL of a 0.5 M borate buffer solution (pH 9.2) with 1 M sodium sulfite. Because sulfite oxidation occurs at a more positive potential than water oxidation, using sulfite oxidation as the counter electrode reaction prevented the drift of the anode potential to the potential limit of the potentiostat, which occasionally occurred when water oxidation was used as the counter electrode reaction because the divided cell used in this study was not optimized and caused a significant IR drop during electrolysis. For a three-electrode setup, the counter electrode reaction does not affect the current generated at the working electrode. Therefore, using sulfite oxidation as the counter electrode reaction allowed us to prevent experimental issues unrelated to HMF reduction without affecting the results obtained at the working electrode.

Just prior to use in electrolysis, the working electrode was reduced in a separate borate buffer solution by performing a potential sweep from open circuit potential to −1.5 V vs. Ag/AgCl at 5 mV/s to ensure reduction of any surface oxide species so as to minimize Faradaic loss during HMF reduction. The designated potential was applied to the working electrode by a Bio-Logic VMP2 potentiostat for a duration of 20 C, after which time the solution was collected and analyzed. Mass transport of the HMF solution during the electrolysis was facilitated by magnetic stirrer at approximately 1600 rpm.

5. Product Analysis

Products were detected and quantified using a Bruker Avance III 400 MHz nuclear magnetic resonance (NMR) spectrometer. Calibration curves were generated for both BHMF and HMF by obtaining NMR spectra for a series of solutions of known concentration for each species and plotting the area obtained for signature HMF and BHMF peaks for each concentration. The area for HMF and BHMF peaks of unknown concentrations from the product solution were then plotted against the calibration curves to determine their concentrations. The HMF signal in the product solution was also compared to that of the initial solution to determine the amount of HMF consumed. Since the samples were aqueous solutions, the NMR spectra were collected and processed using a water suppression method to remove the $^1H$ signal from water. As a result, signals for peaks near water (4.7 ppm) were significantly decreased. Water suppression did not affect quantifications of HMF and BHMF.

6. Photoelectrochemical HMF Reduction

LSVs for photoelectrochemical HMF reduction were performed in an undivided cell without stirring using the same solution and procedures described above. The only difference was that the Pt anode was replaced by a $BiVO_4$ photoanode, and the reference electrode was removed to form a two-electrode system. The main purpose of using a $BiVO_4$ photoanode is to decrease the electrical energy input (i.e. applied bias between the working and the counter electrode) necessary for HMF reduction. Therefore, a two-electrode system must be used to evaluate the potential applied between the working and counter electrode. Illumination of the $BiVO_4$ photoanode was achieved through the FTO substrate (back-side illumination) with an Oriel LCS-100 solar simulator with the intensity of the incident light calibrated to be AM1.5 G, 100 mW/cm². The result was compared with LSVs obtained using a two-electrode system composed of a $Ag_{gd}$ electrode and a Pt counter electrode. For this comparison, the sizes of all working and counter electrodes were kept as 1 cm².

Constant potential electrolysis was performed by applying 1.5 V between the $Ag_{gd}$ cathode and the $BiVO_4$ photoanode and passing 5 C under illumination (AM 1.5 G, 100 mW/cm²) using a divided cell. A 0.5 M borate buffer solution (pH 9.2) was used as the electrolyte and the solution in the cathodic compartment contained 0.02 M HMF. This time sulfite was not added to the anodic compartment because the potential necessary for full cell operation with the presence of only HMF and water as electrochemically active species needed to be evaluated accurately. The cell reactions are summarized below.

Cathode Reaction:

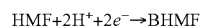

$$HMF + 2H^+ + 2e^- \rightarrow BHMF$$

Anode Reaction:

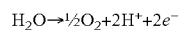

$$H_2O \rightarrow \tfrac{1}{2}O_2 + 2H^+ + 2e^-$$

Overall:

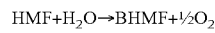

$$HMF + H_2O \rightarrow BHMF + \tfrac{1}{2}O_2$$

When a two-electrode system is used, while the potential difference between the cathode and the anode is fixed at 1.0 V, the actual potentials applied to the WE and CE are not controlled and can be influenced by various conditions. The electrochemical study on HMF reduction showed that −1.3 V vs. Ag/AgCl (equivalent to −0.56 V vs. RHE) is an optimum potential for the $Ag_{gd}$ electrode to reduce HMF to BHMF with the highest yield and FE. In order to ensure that the potential applied to the $Ag_{gd}$ electrode is near this value, optimization was performed by monitoring the potential applied to the $Ag_{gd}$ and the $BiVO_4$ electrode by measuring the potential between each of these electrodes and a Ag/AgCl (4M KCl) reference electrode that was not connected to a potentiostat using a multimeter. The optimum potentials were achieved when the size of the $BiVO_4$ (2 cm²) was 4 times larger than the size of the $Ag_{gd}$ electrode (0.5 cm²). Additionally, stirring was conducted only in the $BiVO_4$ anode compartment. This facilitated the current generation at the anode, which in turn resulted in the application of a more negative potential to the $Ag_{gd}$ cathode to generate a matching current. As a result, a desired potential, ~−1.3 V vs. Ag/AgCl, was achieved at the $Ag_{gd}$ electrode, which resulted in the production of BHMF with a FE of 94.1% and a yield of 94.8%.

Example 2

Figure 6:
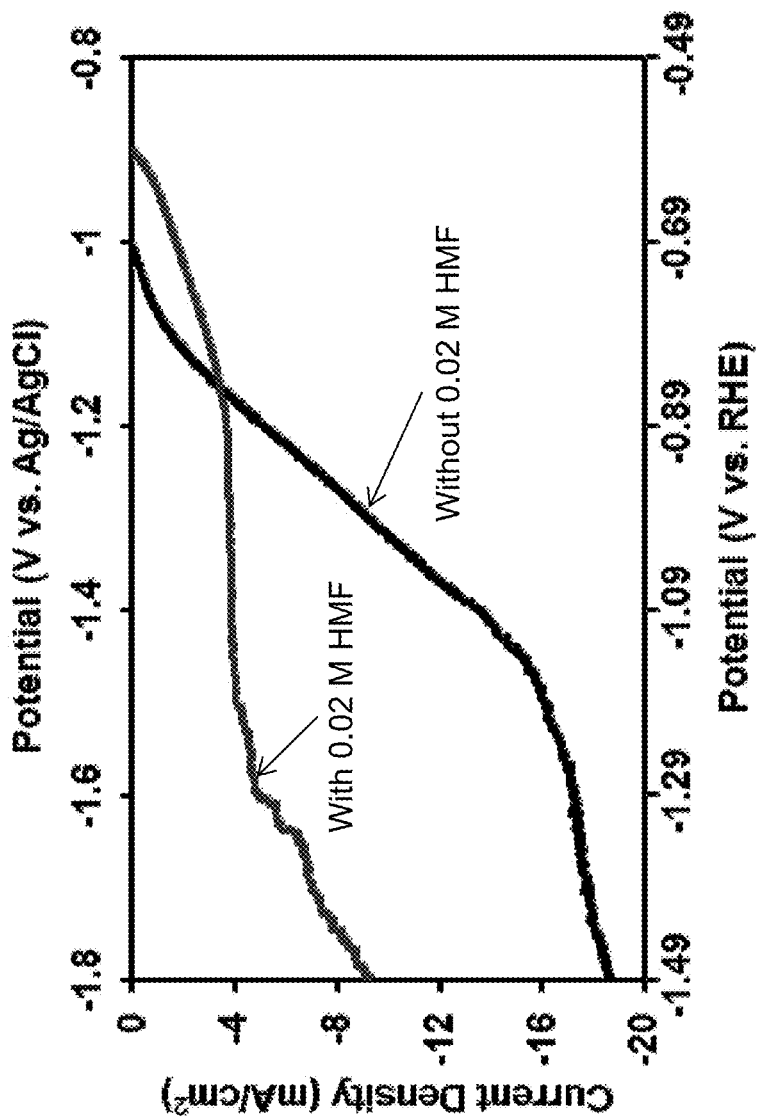

This example demonstrates the electrochemical reductive ring opening of 5-hydroxymethylfurfural to 2,5-hexanedione. To investigate the catalytic abilities of Zn electrodes to electrochemically reduce 5-hydroxymethylfurfural (HMF), linear sweep voltammetry (LSV) was performed using solutions with and without HMF. The general experimental setup included a three-electrode system—a Zn working electrode (WE), Pt counter electrode (CE), and a Ag/AgCl (4 M KCl) reference electrode (RE)—in an undivided cell controlled by a Bio-Logic VMP2 potentiostat. 0.2 M potassium sulfate buffer solutions (pH 2) with and without 0.02 M HMF were used for the analysis. The solutions were purged with $N_2$ to remove dissolved oxygen prior to obtaining LSVs, for which the potential was swept to the negative direction from the open circuit potential to −1.8 V vs. Ag/AgCl (4 M KCl) at 5 mV/s without stirring. Multiple scans were performed for each solution to ensure reproducibility of results. The LSVs (FIG. 6) indicate that HMF reduction occurs prior to water reduction. The current remains quite flat in the region $-1.1\ V \geq E \geq -1.5\ V$ vs. Ag/AgCl ($-0.49\ V \geq E \geq -1.19\ V$ vs. RHE) for HMF reduction as opposed to the current increase observed for water reduction in the solution without HMF, indicating a suppression of water reduction by the presence of HMF. This is consistent with the visible lack of significant $H_2$ gas evolution at the surface of the Zn electrode.

Constant potential electrolysis experiments were conducted to quantify products, yields, and Faradaic efficiencies for HMF conversion, and to observe any potential-dependent product formation. Using a three-electrode setup in an H-shaped cell divided by a glass frit, the Zn WE and the RE were immersed in 14 mL of a 0.2 M potassium sulfate or potassium phosphate buffer solution (pH 2) containing 0.02 M HMF. The CE was immersed in 14 mL of a 0.2 M sulfate or phosphate buffer solution (pH 2). The designated potential, $-1.1\ V \geq E \geq -1.4\ V$ vs. Ag/AgCl ($-0.49\ V \geq E \geq -1.09\ V$ vs. RHE), was applied to the WE by the potentiostat for a set duration of charge passed (usually 20 C), after which time the solution was collected and analyzed. Mass transport of the HMF solution during the electrolysis was facilitated by magnetic stirrer at approximately 1600 rpm. Products were detected and quantified using a Bruker Avance III 400 MHz nuclear magnetic resonance (NMR) spectrometer, as well as a Shimadzu QP2010-Ultra gas chromatography-mass spectrometer (GCMS).

The major HMF reduction product observed in the stated potential region was 2,5-hexanedione (HD) (FIG. 7). Neither intermediate products nor easier 2-electron reduction reactions such as reduction of the formyl group to BHMF or reduction of the furan ring (without ring opening) were observed. The conversion to HD largely demonstrates a potential-independent trend for Faradaic efficiency (FE). The FE for HD formation was calculated using the following equation.

$$FE(\%) = \frac{\text{mol of } BHMF}{\text{Total charge passed}/(F \times 6)} \times 100\%$$

At pH 2, regardless of the buffer type (either sulfate or phosphate buffer), the highest average FE of 74.9% for HD formation occurs at −1.1 V vs. Ag/AgCl (−0.79 V vs. RHE) whereas the average FE for $-1.2\ V \geq E \geq -1.4\ V$ vs. Ag/AgCl ($-0.49\ V \geq E \geq -1.09\ V$ vs. RHE) is near 70%.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for the electrochemical reduction of a furfural to a furan alcohol in an electrochemical cell comprising: an anode in an anode electrolyte solution; and a cathode in a cathode electrolyte solution, wherein the cathode electrolyte solution comprises a furfural and the cathode comprises a material that is catalytically active for the reduction of the furfural to the furan alcohol, the method comprising: creating a potential difference between the anode and the cathode to provide a flow of electrons from the anode to the cathode, wherein the electrons at the cathode undergo reduction reactions with the furfural to form the furan alcohol with a Faradaic efficiency of at least 80%.

2. The method of claim 1, wherein the furfural is 5-hydroxymethylfurfural and the furan alcohol is 2,5-bis(hydroxymethyl)furan.

3. The method of claim 2, wherein the 2,5-bis(hydroxymethyl)furan is formed with a Faradaic efficiency of at least 90%.

4. The method of claim 3, wherein the material that is catalytically active for the reduction of the furfural is silver.

5. The method of claim 4, wherein the silver has a dendritic fractal morphology.

6. The method of claim 1, wherein the furfural is 5-methylfurfural and the furan alcohol is 5-methylfurfuryl alcohol.

7. The method of claim 1, wherein the furfural is furan-2-carbaldehyde and the furan alcohol is 2-furanmethanol.

8. The method of claim 1, wherein the material that is catalytically active for the reduction of the furfural is indium.

9. The method of claim 1, wherein the cathode electrolyte solution has a pH in the range from about 9 to about 9.5.

10. The method of claim 1, wherein the furan alcohol is formed with a Faradaic efficiency of at least 90%.

11. The method of claim 10, wherein the material that is catalytically active for the reduction of the furfural is silver.

12. The method of claim 11, wherein the silver has a dendritic fractal morphology.

13. The method of claim 1, wherein the cathode electrolyte solution has a pH in the range from about 8 to about 11.

14. The method of claim 1, wherein the cathode electrolyte solution is an aqueous solution.

15. A method for the electrochemical reduction of a furfural to a furan alcohol in an electrochemical cell comprising: an anode in an anode electrolyte solution; and a cathode in a cathode electrolyte solution, wherein the cathode electrolyte solution comprises a furfural and the cathode comprises a material that is catalytically active for the reduction of the furfural to the furan alcohol, the method comprising: creating a potential difference between the anode and the cathode to provide a flow of electrons from the anode to the cathode, wherein the electrons at the cathode undergo reduction reactions with the furfural to form the furan alcohol at a yield of at least 80%, wherein the material that is catalytically active for the reduction of the furfural is silver.

16. The method of claim 15, wherein the silver has a dendritic fractal morphology.

17. The method of claim 15, wherein the furfural is 5-hydroxymethylfurfural and the furan alcohol is 2,5-bis(hydroxymethyl)furan.

18. The method of claim 17, wherein the 2,5-bis(hydroxymethyl)furan is formed at a yield of at least 98%.

19. The method of claim 15, wherein the furfural is 5-methylfurfural and the furan alcohol is 5-methylfurfuryl alcohol.

20. The method of claim 15, wherein the furfural is furan-2-carbaldehyde and the furan alcohol is 2-furanmethanol.

21. The method of claim 15, wherein the cathode electrolyte solution has a pH in the range from about 8 to about 11.

22. The method of claim 15, wherein the cathode electrolyte solution is an aqueous solution.

* * * * *

UNITED STATES PATENT AND TRADEMARK OFFICE
CERTIFICATE OF CORRECTION

PATENT NO. : 9,885,119 B2
APPLICATION NO. : 14/620628
DATED : February 6, 2018
INVENTOR(S) : Kyoung-Shin Choi et al.

It is certified that error appears in the above-identified patent and that said Letters Patent is hereby corrected as shown below:

In the Specification

Column 1, Line 34:
Delete the phrase:
"$2CuO.Cr_2O_3$"
And replace with:
--$2CuO \cdot Cr_2O_3$--

Column 15, Line 59:
Delete the equation:
"$$FE\ (\%) = \frac{\text{mol of BHMF}}{\text{Total charge passed}\ /\ (F \times 6)} \times 100\%$$"
And replace with the following equation:
--$$FE\ (\%) = \frac{\text{mol of HD formed}}{\text{Total charge passed}\ /\ (F \times 6)} \times 100\%$$--

Signed and Sealed this
Sixteenth Day of October, 2018

Andrei Iancu
*Director of the United States Patent and Trademark Office*